United States Patent
Ross et al.

(10) Patent No.: US 9,223,600 B1
(45) Date of Patent: Dec. 29, 2015

(54) IN-PROCESSOR DYNAMIC ADDRESS REDIRECTION TABLE FOR SUBSTITUTING INSTRUCTION STRINGS

(75) Inventors: Jonathan K. Ross, Woodinville, WA (US); Dale C. Morris, Steamboat Springs, CO (US); James M. Hull, Saratoga, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1111 days.

(21) Appl. No.: 11/745,422

(22) Filed: May 7, 2007

(51) Int. Cl.
*G06F 9/455* (2006.01)

(52) U.S. Cl.
CPC .................................. *G06F 9/45533* (2013.01)

(58) Field of Classification Search
CPC .................................................. G06F 9/45533
See application file for complete search history.

(56) References Cited

U.S. PATENT DOCUMENTS

| | | | |
|---|---|---|---|
| 5,581,722 A * | 12/1996 | Welland | 711/207 |
| 6,397,242 B1 * | 5/2002 | Devine et al. | 718/1 |
| 6,591,343 B1 * | 7/2003 | Col et al. | 711/125 |
| 6,996,748 B2 | 2/2006 | Uhlig et al. | |
| 7,124,327 B2 | 10/2006 | Bennett et al. | |
| 2004/0111591 A1 * | 6/2004 | Arimilli et al. | 712/228 |

OTHER PUBLICATIONS

Andrew S. Tanenbaum, Structured Computer Organization, 1984, Prentice-Hall Inc., Second Edition, pp. 10-12, 23, 24.*

* cited by examiner

*Primary Examiner* — John Lindlof
(74) *Attorney, Agent, or Firm* — Clifton L. Anderson (57) ABSTRACT

A data processor includes a redirection dynamic address redirection table (DART) for redirecting instruction fetches from an original memory location with an original address to a target memory location with a target address.

35 Claims, 4 Drawing Sheets

IN-PROCESSOR DYNAMIC ADDRESS REDIRECTION TABLE FOR SUBSTITUTING INSTRUCTION STRINGS

BACKGROUND OF THE INVENTION

Virtualization is a technology that allows an operating system designed to run as the exclusive manager of a hardware platform to run in an isolated container (virtual machine), possibly in parallel with other virtual machines, on a single instance of hardware (a physical machine). The operating system in a virtual machine runs as a "guest" on a host operating system. For much of the time a system is running, a host operating system can simply allow application and guest operating system instructions to execute without modification. However, there are important exceptions. For example, the host operating system may reserve certain areas of physical memory for its exclusive use. The virtualization environment must deny the guest operating system access to these areas of memory, while providing the same response to the guest operating system that it would have received if it had been running directly on the hardware.

Some processors detect and handle instructions that must behave differently in a virtual machine. When such an instruction is detected in the instruction pipeline, a virtualization fault-handling routine can be initiated, e.g., using an interrupt. The fault-handling routine reads a copy of the detected instruction from its main memory location, determines what it was intended to do, and then issues a string of instructions to fulfill the instruction's intention without interfering with the host operating system, e.g., by allowing the guest operating system to access a virtual memory location that it can treat as the intended physical memory location. Then control can be returned to the instruction stream that was executing just before the interrupt.

The interrupt imposes a serious performance penalty, as a single instruction execution has been replaced by two context switches and an instruction handling routine. If the faulting instruction is just one of a series of such instructions and if the faulting instructions are called for repeatedly, the performance hit can be intolerable.

One approach to reducing this performance hit is to replace problematic instructions with "traces" that emulate those instructions. The first time a problematic instruction is encountered, an interrupt is triggered. The virtualization fault handling routine accesses a copy of the instruction in main memory, determines its intent, generates and stores an emulating trace, and replaces the problematic instruction with a branch instruction to the trace. The next time the problematic instruction is called, the emulating trace executes without an interrupt having to be generated. Thus, a significant performance advantage is achieved.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

FIG. 2 is a flow chart of a method in accordance with an embodiment of the invention implemented in the computer system of FIG. 1. In FIG. 2, dashed flow arrows are associated exclusively with DART hits, while solid arrows can indicate flows exclusive to DART misses or associated with both DART hits and DART misses.

DETAILED DESCRIPTION

In the course of the present invention, some problems associated with modifying the guest-system code were recognized. Sometimes a virtualization monitor needs to create copies of guest pages if the guest creates an alias (a different reference address for the same physical memory). For example, if a given kernel text page can be executed from multiple addresses, the monitor may have to make multiple copies of the page in physical memory and patch each copy differently, since the IP displacement to the trace will be different, depending on which address the guest uses to execute this code.

Another problem is that the monitor must never allow a page to be read once it has been patched by the virtualization monitor. If the guest reads or writes its text page, the monitor has to catch the read/write and put the page back the way it was. This additional complexity involves some performance impact, as well, involving run-time checks the monitor must make when handling translation look-aside buffer (TLB) misses. Additionally, the complexity imposes a significant limit on the speed of development of new capabilities in virtual environments: it is more difficult to add new capabilities into a larger, more complex, code base than into a smaller, simpler one.

The present invention addresses these problems and others by providing a dynamic address redirection table that maps the "original" addresses of original instructions to the "target" addresses of traces (target instructions) that are to be executed instead of the source instructions. In the context of virtualization, a guest-code instruction would be an original instruction and a trace would be a target instruction. DART hits result in target instructions being executed without requiring an interrupt and without requiring modification of existing code. This high performance is obtained without having to track changes to original code.

Figure 1:
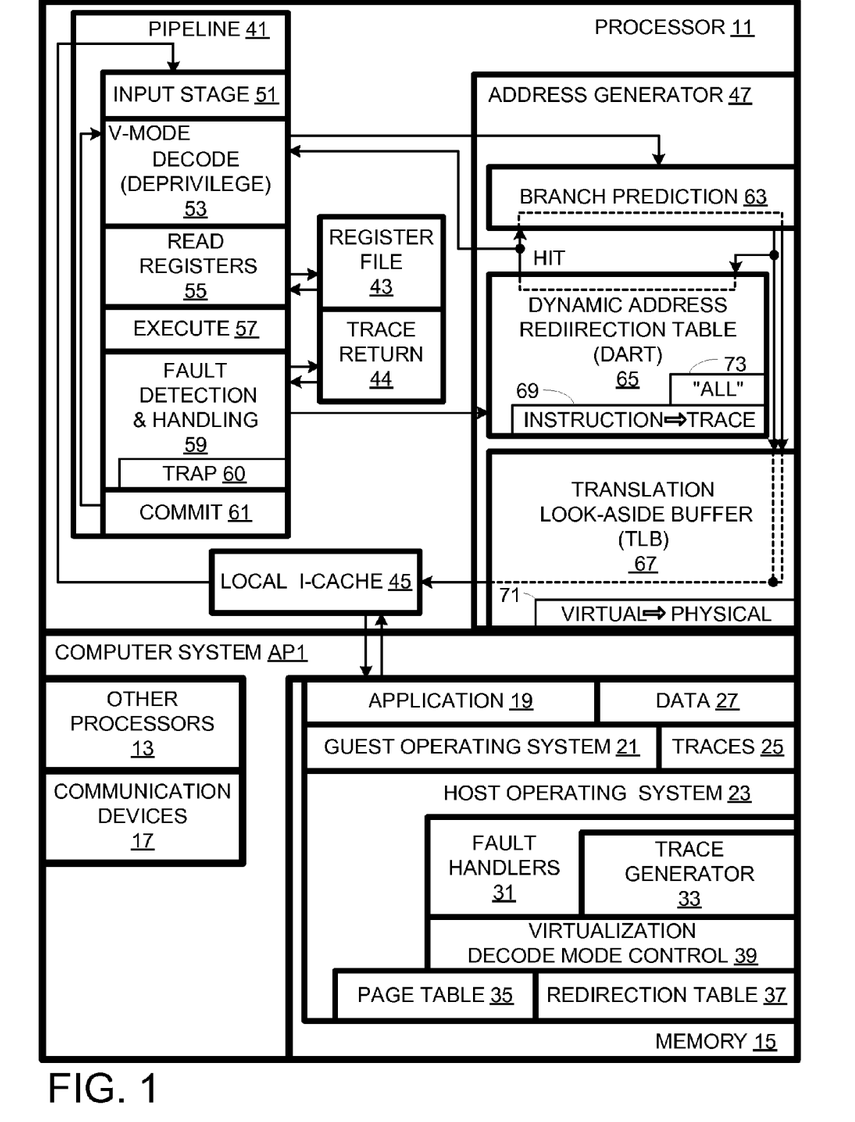
FIG. 1 is a schematic diagram of a computer system emphasizing a first processor design in accordance with an embodiment of the invention.

Computer system AP1 comprises processors 11 and 13, computer-readable storage media including memory 15, and communications devices 17, as shown in FIG. 1. Memory 15 stores an application program 19, a guest operating system 21, a host operating system 23, other programs as known in the art, traces 25, and data 27. Memory 15 can include main memory and caches external to processors 11 and 13. Host operating system 23 includes fault handlers 31 including a trace generator 33, a virtualization page table 35, a redirection table 37, and a virtualization decode mode controller 39.

Computer system AP1 is a symmetric multiprocessor system, one processor 11 of which is shown in some detail in FIG. 1. Processor 11 includes a pipeline 41, a register file 43 and a special purpose trace return register 44, a local instruction cache 45, and an address generator 47. Pipeline 41 includes the following stages: an input stage 51, an instruction decoder 53, a read register stage 55, an execution stage 57, a fault detection and handling stage 59 including a trap 60, and a commit stage 61.

Address generator 47 includes a branch prediction stage 63, a dynamic address redirection table (DART) 65, and a translation look-aside buffer (TLB) 67. DART 65 includes a cache 69, which stores a subset of the information in redirection table 37, which associates instruction addresses with trace addresses. TLB 67 includes a cache 71 that stores a subset of the information in page table 35, which associates virtual pages with physical pages. The granularity of DART 65 and redirection table 37 is finer than that of TLB 67 and page table 35 as the former points to individual instructions or instruction bundles instead of full pages.

Herein, a "dynamic address redirection table" or "DART" is a an in-processor table that redirects a memory access from a original memory location to a target memory location by substituting an address for the target memory location for an address for the original memory location. It is dynamic in two senses: 1) it operates on addresses as they are generated, and 2) it is typically updated during execution of a program even if that program is unaware of the DART.

A "translation look-aside buffer" or "TLB" is an in-processor table that translates a virtual address for a memory location into its physical address. Unlike a DART, a TLB does not redirect from one memory location to another; a TLB only translates between two names for the same memory location.

The invention provides for a DART to act as a cache for a redirection table in memory. In this aspect, there are analogies to the relationship between a TLB and a page table, so many TLB techniques can be applied to a DART. For example, in the event of a DART miss, some embodiments use a hardware walker to look for an asserted address in the redirection table. If it is found, the instruction at the target address can be fetched instead of the instruction at the original address. Alternatively, a DART miss can result in an interrupt, which calls a redirection handler that examines the redirection table, generating a trace only if there is a redirection table miss.

Since a DART can be used with either or both of a trace generator and a memory-based redirection table, there are DART embodiments that do not have TLB counterparts. If there is no memory-based redirection table, a DART does not act as a cache. It simply stores mappings of original addresses to target addresses generated by the trace generator. Overwritten entries result in lost traces. If the original address is reasserted after its entry has been overwritten, a DART miss will occur, and the trace generator will regenerate and store (most likely in a new target location) a trace, and enter a new mapping of original to target (trace) address in the DART. In an alternative embodiment, a memory based redirection table can be used to store overflow from a DART; in such a case, the memory-based redirection table is full of former but subsequently overwritten DART entries.

Figure 2:
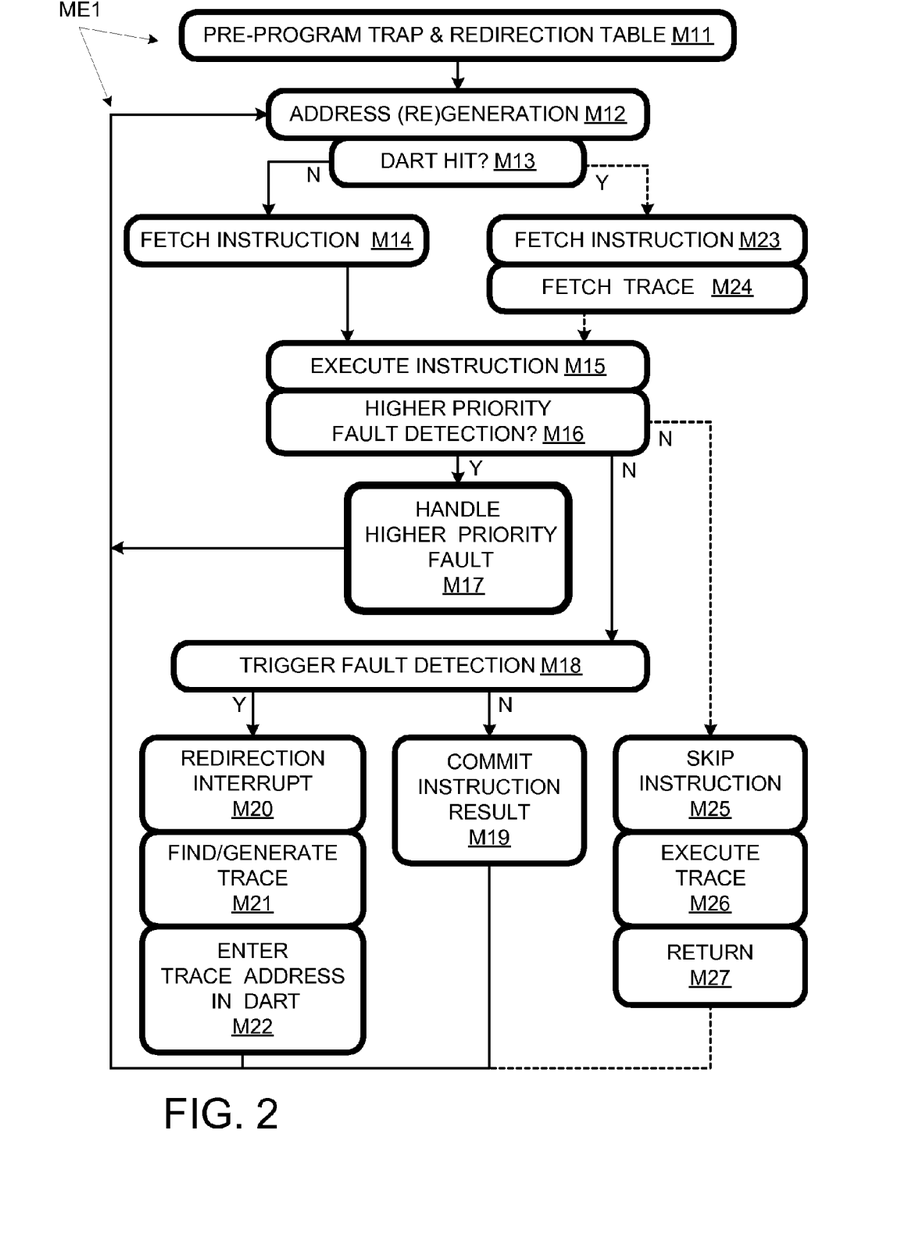

The functions of the components of processor AP1 are described further with respect to a method ME1 of the invention, flow-charted in FIG. 2. At method segment M11, trap 60 can be pre-programmed by writing to a debug register. Also, redirection table 37 can be partially or completely filled in advance. Additionally, DART 65 can be partially or completely pre-filled, either using dedicated instructions, or by calling instructions to be emulated or substituted and triggering trace generator 33.

Method segment M12 involves address generation. An address can be generated by incrementing an address pointer, or by determining what branch is to be taken or might be taken (branch prediction). Another aspect of address generation will be explained later in the context of DART hits.

The instruction address is input to DART 65 at method segment M13, resulting in a "hit", if the address is represented in DART 65, or a "miss", if the address is not represented. In the event of a miss, the instruction is fetched at method segment M14. To this end, TLB 67 converts the generated virtual address to a physical address and checks instruction cache 45 for the requested instruction. If necessary, the instruction is fetched from the physical memory location indicated by the TLB output. The fetched instruction enters pipeline 41 at input stage 51.

The fetched instruction is decoded and executed at method segment M15. Also, branch prediction for the next instruction address can be initiated. Execution method segment M15 involves reading any necessary registers and performing a requested operation. However, it can also involve performing no operation, e.g., if the instruction is a no-operating instruction or if the predicate for the instruction indicates that is not to be executed.

Once the instruction has been executed, fault detection is performed at method segment M16. If a higher-priority fault is detected, it handled at method segment M17; method ME1 then returns to method segment M12. If no higher-priority fault is detected, then if a DART-trigger fault is detected at method segment M18, a result is committed at method segment M19. Herein, a "DART-trigger" fault is a fault that when detected results in a DART being written to or a DART generating a target address. In the meantime, the branch predictor 63 can validate or invalidate the branch prediction that led to the original instruction being fetched. In the case of validation, the next instruction in the pipeline is executed. In the case of invalidation, instructions in the pipeline as a result of mis-predictions are flushed, and processing resumes at a non-speculative instruction address.

If, at method segment M18, a DART-trigger fault is detected (in the case of a DART miss at method segment M14), an interrupt is generated at method segment M20. For such a fault, a redirection interrupt is generated at method segment M19. In an alternative embodiment, a hardware walker (analogous to those used with some TLBs) checks a memory-based redirection table before calling an interrupt.

The interrupt calls for one or more traces, i.e., strings of emulating or other substitute instructions to be found or generated at method segment M21. Each substitute string or trace is to replace a string of original instructions beginning with the subject instruction that triggered trace generation.

A trace can be a single instruction or a series of instructions. It can emulate a single original instruction or a series of original instructions. Emulating a series of original instructions reduces the number of interrupts and traces that must be handled. Because emulating branch behavior can be complex, traces in the illustrated embodiment do not emulate past original branch instructions. However, in an alternative embodiment, complex traces emulate original code including branch instructions.

In some cases, plural related traces are generated in response to one interrupt to handle branching original code or to handle constraints on the length of original instruction strings that can be represented by a single trace. In other embodiment, only one trace can be generated per interrupt. For simplicity in handling write operations that could interfere with a trace (e.g., by overwriting some or all of the code the trace was designed to emulate), it would be possible for the trace generator to constrain traces to emulate or replace only original code strings that do not cross page (or other power-of-two-aligned) boundaries.

If the instruction address is represented in redirection table 37, the table output is the address of a target instruction or instructions. If the instruction address is not represented in table 37, such an instruction or series of instructions is generated and stored in a memory location. In the case of a virtualization fault, the target instruction or series of instructions is a trace.

For embodiments without a hardware lookup of the memory-based redirection table, software must update DART 65 either when the trace is generated or when software looks up the trace address. Note that the invention provides for emulating an instruction without updating DART 65; for example, a trace could refrain from making a DART entry until the trace was called some predetermined number of times.

Whether the trace is found or generated, the address of the instruction and the emulating address are associated in DART 65 at method segment M22. If there is a slot in DART 65 with no valid data, the new entry can be stored there. Otherwise, some entry that has not been used recently can be overwritten. If multiple traces were found or generated in response to the interrupt, multiple entries can be written to DART 65. If the entry was not found in table 37, an entry or entries can be made there as well. Then, if the new entry in the DART is subsequently overwritten, the backup copy in table 37 is still available.

In any event, method ME1 returns to method segment M12 and the address asserted at the previous iteration of method segment M12 is reasserted. In an iteration of method ME1 following an entry into DART 65 at method segment M22, the address that caused the entry is regenerated at method segment M12. Since that address was just entered into DART 65, a DART hit will occur at this iteration of method segment M13. As a result, the instruction will be re-fetched at method segment M23. At method segment M24, the trace at the address associated with the instruction address in DART 65 is fetched so that it follows the instruction in pipeline 41.

In an alternative embodiment, method segment M23 is skipped and only the trace is fetched. In that embodiment, the trace must determine whether a fault with higher priority than a DART-trigger fault would have occurred, thus obviating the need for the trace to be executed. In the illustrated embodiment, the hardware designed for detecting faults handles this responsibility—simplifying trace generation.

In the illustrated embodiment, the instruction is (re-) executed at method segment M15. Again, if a fault of higher priority than a DART-trigger fault is detected, that fault is handled and then method ME1 reiterates. If no higher-priority fault is detected at method segment M16, the instruction is skipped at method segment M25 in favor of its trace, which is executed at method segment M26. Of course, the trace instructions are subject to DART table 65, and fault detector 59, but, with proper design of trace generator 33, the trace instructions will result in DART misses and will not trigger DART-related faults.

In an alternative embodiment, if a DART-trigger fault is not detected and no higher priority fault is detected, the instruction is committed at method segment M19. If a trace follows in the pipeline due to a DART hit, it is treated as the result of a failed branch prediction and flushed from the pipeline. The proper branch can then be determined and taken.

When a trace has completed executing, method ME1 must return at method segment M27 to iterate method ME1. Traces can end in branch instructions either to the next un-emulated original instruction, or to another trace in a series or system of traces. The trace generator can determine the address of the next original instruction. If the original program accesses the same instruction using different addresses (e.g., physical versus virtual, or different virtual addresses), the illustrated embodiment can generate one trace and one DART entry for each version of the address. This approach avoids the prior art problem of having to generate separate copies of the page in which the instruction is located to handle different address spaces.

To avoid having to generate more than one trace for the same original address, processor 11 provides trace return register 44. The address of the instruction that causes the trace generator to be called is written to this register 44. A trace ending in a relative return instruction can specify an offset from the address in register 44 to return to the next instruction to be executed. This is possible because trace generator 33 can determine how many instructions are in the string the trace emulated or otherwise replaced. In an alternative embodiment, a return can be effected implicitly, e.g., after a fixed number (one or n) trace instructions.

Since guest code is not modified, guest reads of guest code do not pose any special problem. However, guest overwrites of guest code can invalidate a trace. Accordingly, guest writes to guest code must be intercepted and handled. However, since traces can represent original strings of varying length, there is a need to determine whether or not there is interference when a write is to an address following the address of a triggering instruction represented in DART 65 or redirection table 37.

Since trace generator 33 ensures that no trace corresponds to original code that crosses a page boundary (or some other power-of-2 boundary), if a page (or some other power-of-2 range) to which a write operation is directed does not contain any traces, there is no interference. However, if there is a trace on that page (or range), there might be interference. In the illustrated embodiment, interference is assumed if the page (or range) written to contains a trace and the trace is purged from DART 65 and redirection table 37. Determining whether a page (or range) that is written to contains a trace simply involves comparing high-order address bits.

To check for interference, all redirection table entries must be tested. If redirection table 37 includes entries not in DART 65, then redirection table 37 must be checked. However, if DART 65 represents all entries in redirection table 37, then only DART 65 needs to be checked.

DART 65 includes an "all" flag 73 indicating whether all traces represented redirection table 37 are also represented in DART 65. This flag is managed by trace generator 33. Of course, embodiments lacking a memory-based redirection table, all traces are inherently represented in the DART. If the "all" flag indicates the DART represents all traces, trace interference can be detected or excluded without an interrupt. If the "all" flag indicates not all traces are represented in DART 65, an interrupt is asserted to check redirection table 37. (In an alternative embodiment, a hardware walker can be used for this purpose.) If a write interferes with a trace, the trace is discarded by removing entries for that trace in DART 65 and table 37.

In the embodiment of FIG. 1, DART 65 hits are determined near the beginning of the pipeline, yet the instruction proceeds through execution. This allows hardware to determine whether a higher priority exception or even no exception would obviate the need for a trace. In an alternative embodiment, the trace is fetched instead of the instruction in the event of a DART hit. The trace then must determine whether something other than the expected exception would have occurred if the instruction had been fetched and executed. In that case, the trace will have to perform the role of a fault detector to determine if a higher-priority fault would apply. The illustrated embodiment provides for simpler traces at the expense of more complex hardware.

Figure 3:
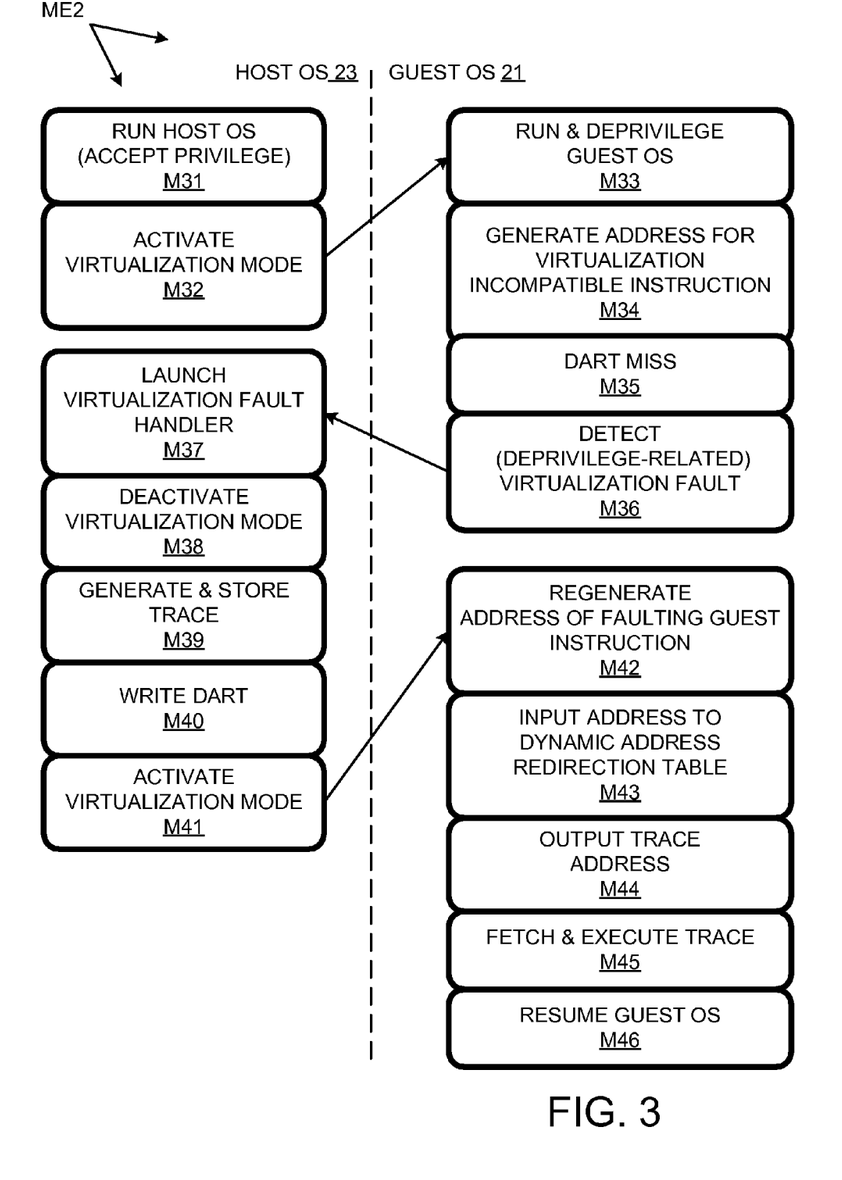
FIG. 3 is a flow chart of another method in accordance with an embodiment of the invention implemented in the computer system of FIG. 1.

The more software-favoring approach is described in method ME2, flow-charted in FIG. 3, with reference to another mode of processor 11 of FIG. 1. In this case, a virtualization context is emphasized.

Method segments M31-M46 are divided between steps involving primary host operating system 23 and guest operating system 21 (and thus application 19). At method segment M31, host operating system 23 is run. Before turning over pipeline 41 to code provided by guest operating system 21, host OS 23 activates virtualization mode for processor 11 at method segment M32. In this mode, any privileged instructions are depriliviged when decoded.

An example of a privileged instruction would be a write of TLB 67 that controls the mapping of virtual addresses to physical addresses. If a program other than the host operating system could alter TLB 67 without the host OS knowing, the ability of host OS 23 to manage memory would be compromised. Accordingly, all such accesses by a guest OS must be intercepted by the host OS. Of course, guest operating system 21 assumes it is interacting with hardware directly and accordingly may issue a privileged instruction for writing to TLB 67. However, if that instruction executes as expected by guest OS 21, the host OS 23 loses control of the virtual memory mapping scheme. To preclude this, instruction decoder 53 depriveleges instructions received while virtualization mode is active.

At method segment M33, guest OS code (as well as application code) is run on processor 11. As guest instructions are processed, branch predictor 63 generates addresses of memory locations from which instructions are to be fetched at method segment M34. These addresses are input to DART 65; if the result is a DART miss at method segment M35, the branch prediction address is translated to a physical address by TLB 67 and the associated instruction is fetched.

Since processor 11 is in virtualization mode at this point, any privileged instruction is depriveleged upon decoding. As guest instructions are executed, a depriveleged instruction, such as a TLB write instruction, may be fetched at method segment M35. This initially privileged code is depriveleged upon decoding at method segment M33. The depriveleged instruction results in a fault detection at method segment M36. For example, upon execution, an attempt to write to TLB 67 is denied for lack of privilege.

In response to the fault detection, fault detector and handler 59 initiates an interrupt that calls trace generator 33 at method segment M37. So that trace generator 33 can access protected memory, the interrupt procedure deactivates virtualization mode and resumes it when the fault handler is done.

Trace generator 33 determines the memory location of the faulting instruction, accesses the faulting instruction at that location, and prepares a trace, at method segment M39, to emulate that instruction. In some embodiments, the trace only emulates a single instruction. However trace generator 33 generates a trace that emulates a series of instructions from the faulting instruction up to the next branch instruction or as far beyond the faulting instruction program flow can be determined statically (e.g., without being run). While the invention can handle traces that trigger redirection faults, trace generator is designed to avoid creating them. The trace is then stored in memory.

At method segment M40, the address of the memory location storing the trace is associated with the address of the faulting instruction in DART 65 and in redirection table 67. If DART 65 is already full, an existing entry will have to be overwritten in accordance with a caching algorithm, e.g., a least recently used or not-recently used replacement algorithm. Since entries to DART 65 are also stored in redirection table 37, they can be found there after the corresponding entry has been overwritten in DART 65. In embodiments without a redirection table, a DART overwrite loses the trace; the trace will have to be regenerated if it is needed again.

Once the new trace is written into DART 65, host OS can reactivate virtualization mode at method segment M41. Then, guest OS 21 can resume in virtualization mode at method segment M42. In the illustrated embodiment, the address of the faulting instruction is regenerated at method segment M42. At method segment M43, the address of the previously faulting instruction is input to DART 65. This time, a DART hit results so that the trace address is output at method segment M44. TLB 67 translates this output to a physical address, from which the trace generated at method segment M18 is fetched at method segment M45. Once the trace has executed, a final branch instruction resumes the guest OS at method segment M46.

Processor 11 has its DART determinations prior to execution. It is also possible to wait until fault detection to test for redirection. A second processor 311, illustrated in FIG. 4, in accordance with the invention greatly reduces the number of instructions that must be processed by a DART at the expense of an increased number of failed redirection-type branch predictions. This tradeoff is more favorable when the virtualization-fault instructions are more rarely called.

Figure 4:
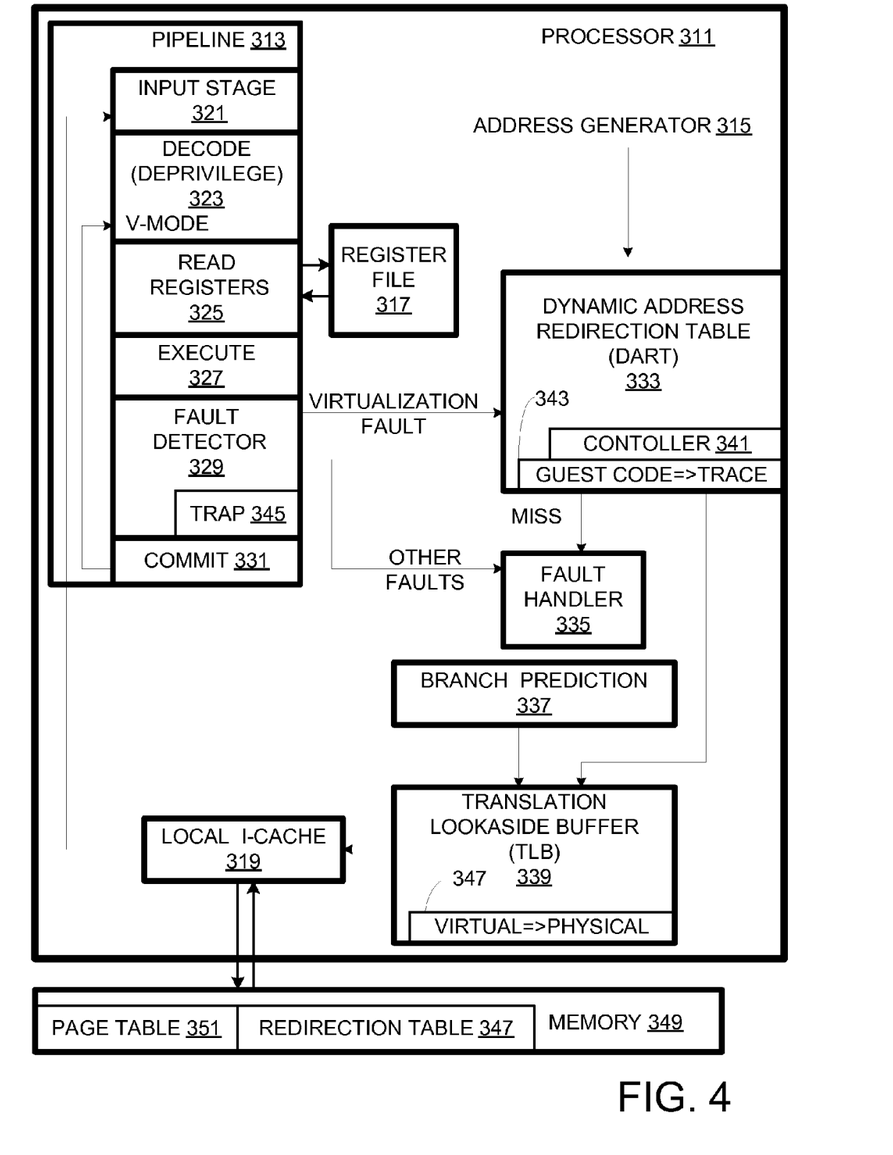
FIG. 4 is another schematic diagram of the computer system of FIG. 1 emphasizing a different processor design.

Processor 311 comprises a pipeline 313, an address generator 315, a register file 317, and a local instruction cache 319. Pipeline 313 includes an input stage 321, a decode stage 323, a read stage 325, an execute stage 327, a fault-detection stage 329, and a commit stage 331. Address generator 315 includes a DART 333, which includes a controller 341 and a trace cache 343. Fault detector 329 includes an instruction trap 345. Trap 345 can be programmed to trap any instruction that otherwise might not result in a detectable virtualization fault but that can return an erroneous result. Trapped instructions are handled as if a fault were detected.

In processor 311, fault detection and fault handling are separate functions so that redirection can occur between them. Note that branch predictor 337 feeds directly into TLB 339. In the event of a DART hit, pipeline 313 is re-started at the output of DART 333, the virtual address of the trace to be fetched. In the event fault handler 335 detects a DART-trigger fault for an instruction subjected to a DART miss, fault handler 335 calls a trace generator that generates an emulating trace and makes a corresponding entry in DART 333.

Not all DART-trigger instruction addresses are input to DART 333. In some cases, an instruction may be subject to more than one fault in a prioritized system of faults. If an instruction subject to a virtualization fault is also subjected to a higher priority fault, the fault handling procedure for the higher priority fault is addressed first.

In processor 311, only the addresses for instructions that result in a fault-detection are input to DART 333. Most instructions do not result in fault detections and thus most addresses bypass DART 333. Accordingly, DART misses can lead to a look-up in a redirection table 347 in memory 349, just as a TLB miss can result in a look-up in page table 351. In an alternative embodiment, only addresses of instructions that result in a virtualization (as opposed to other) fault detection are input to DART 333.

Especially where a redirection table is available as an expanded version and a backup, DART 333 can serve purposes not directly related to virtualization. A DART can be used to redirect in response to a variety of problematic instructions, including un-implemented and poorly implemented instructions. More generally, instructions can be input to a DART whenever an appropriate software or hardware trigger is detected. For example, the trigger could be an instruction that has a processor bug. The trace could be a set of instructions that do what the instruction without the bug was supposed to do.

The relationship between source instructions (e.g., a DART-trigger instruction) and target instructions (e.g., a trace) need not be one to one. The interrupt handling procedure that generates traces can generate a trace of any length from a series of source instructions. The trace can return the processor to a state corresponding to the last in a series of instructions, not necessarily the instruction that triggered generation of the trace. In general, the DART just provides the target address for the first instruction of the trace. Afterwards, when the guest operating system calls for an instruction already represented in DART 65, the trace will be executed without requiring the source instruction to be fetched or an interrupt to be generated and handled. Accordingly, performance can be much better than approaches that require an interrupt every time a problematic instruction is requested.

Also, no changes are made to the source instructions, so there is no concern with reading or writing pages containing such instructions. Of course, writes to locations of instructions for which traces are been generated must be handled, e.g., by invalidating the affected traces. However guest reads of guest code is not problematic, as nothing has been modified.

Herein, "computer processor" refers to a device that manipulates data in accordance with computer-executable instructions stored in computer-readable media. An "instruction pipeline" is a functional entity of a computer processor that receives, decodes, executes, and commits the results of instructions. An "address generator" is a functional entity of a computer processor that generates addresses of instructions to be fetched into (received by) a pipeline.

Herein, "original" and "target" are defined relative to each other in the context of a redirection table. A target address is output by a redirection table in response to an original address input. An "original memory location" is a memory location referred to by an original address, while a "target memory location" is a memory location referred to by a target address. An "original instruction" is an instruction at an original memory location, while a "target instruction" is an instruction at a target memory location. An emulating instruction, series of instructions or system of instructions beginning at a target address is a "trace". By extension, "trace" refers to these entities beginning at a target address whether they actually emulate or not. "Memory", unless otherwise indicated, refers to addressable memory and not to cache locations or locations in an in-processor redirection table.

A "computer" is a machine that manipulates data in accordance with instructions. A "program" is an ordered series of computer-executable instruction. As used herein, a "program" is inherently tangibly embodied in computer-readable media. A "server" is a computer that provides services, e.g., serves web pages to or responds to database queries from, other computers.

"Computer-readable media" refers to media that can be accessed by a computer and includes volatile and nonvolatile, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules or other data.

"Computer storage media" encompasses, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer.

"Communication media" encompasses computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of "computer-readable media".

The invention provides for many alternatives to the illustrated embodiments. Method segments can overlap in various ways. The location of the DART can vary relative to the instruction pipeline, branch prediction logic, and the TLB. For example, a DART can output physical addresses so that the DART output need not be translated by a TLB. In such cases, the DART outputs take precedence over a parallel TLB output. Also, the DART can map physical address outputs of a TLB to physical addresses of traces. Provisions can be made for writing entries in DARTs of different processors that share responsibility for the same guest OS. These and other variations and modifications to the illustrated embodiments are provided for by the present invention, the scope of which is defined by the following claims.

What is claimed is:

1. A data processor comprising:
   a fault detector to determine whether an instruction is subject to a higher priority fault than a dynamic address redirection table (DART)-triggered fault,
   an address generator including:
      a dynamic address redirection table (DART) for converting a virtual instruction address to a virtual trace address when the instruction is not subject to the higher priority fault, in which:
         the virtual instruction address identifies an instruction location in memory of the instruction, the instruction location also having a physical instruction address,
         and
         the virtual trace address identifies a trace location in memory of a trace of instructions for emulating the instruction, the trace location also having a physical trace address, and
      a translation lookaside buffer (TLB) coupled to the DART to convert the virtual trace address to the physical trace address; and
   an instruction pipeline for receiving and executing the trace.

2. A data processor as recited in claim 1 wherein the address generator is configured to cause both the instruction and at least part of the trace to be fetched into the instruction pipeline so that a trace portion of the trace follows the instruction in the pipeline.

3. A data processor as recited in claim 2 wherein the trace portion immediately follows the instruction in the pipeline.

4. A data processor as recited in claim 2 wherein the trace portion follows the instruction only after the pipeline detects a fault with respect to the instruction.

5. A data processor as recited in claim 1 wherein the address generator causes the trace portion to be fetched from the trace location into the pipeline in lieu of the instruction.

6. The data processor of claim 1, wherein the DART comprises an all flag indicating whether all traces represented in a redirection table are also represented in the DART.

7. A computer processor comprising:
a fault detector to determine whether an instruction is subject to a higher priority fault than a dynamic address redirection table (DART)-triggered fault,
an address generator for asserting addresses on an address bus, the address generator including:
a dynamic address redirection table (DART) for translating a virtual instruction address to a virtual trace address when the instruction is not subject to the higher priority fault, in which:
the virtual instruction address identifies an instruction location in memory of an instruction, the instruction location also having a physical instruction address,
the instruction is not subject to a higher priority fault, the DART stores a subset of information stored in a redirection table, and
the virtual trace address identifies a trace location in memory of a trace for emulating the instruction, the trace location also having a physical trace address, and
a translation lookaside buffer (TLB) for translating the virtual trace address to the physical trace address; and
a pipeline for executing the trace, the pipeline being separate from the address generator.

8. A processor as recited in claim 7 wherein the pipeline executes the instruction, discards the instruction without committing the instruction, and then executes and commits the trace.

9. A processor as recited in claim 7 wherein the pipeline executes and commits the instruction and flushes the trace.

10. A method comprising:
an address generator generating a virtual instruction address of an instruction location of an instruction in memory, the instruction location also having a physical instruction address;
determining whether an instruction is subject to a higher-priority fault than a dynamic address redirection table (DART)-triggered fault;
a dynamic address redirection table (DART) replacing the virtual instruction address with a virtual trace address of a trace location of a trace for emulating the instruction when the instruction is not subject to the higher-priority fault, the trace location also having a physical trace address;
a translation lookaside buffer (TLB) translating the virtual trace address into the physical trace address;
fetching, from the trace location using the physical trace address, the trace into an instruction pipeline of the processor, the pipeline being separate from the address generator; and
the instruction pipeline executing the trace, the address generator, the DART, the TLB, and the instruction pipeline all being components of a processor.

11. A method as recited in claim 10 further comprising:
inputting the instruction address into the DART before fetching the instruction into the pipeline;
fetching the instruction into the pipeline ahead of the trace;
executing the instruction;
detecting a fault associated with the instruction;
discarding the instruction without committing the instruction; and
executing and committing the trace.

12. The method of claim 11, wherein the trace determines whether a fault would occur if the instruction had been fetched.

13. A method as recited in claim 10 wherein the trace is fetched instead of the instruction.

14. A method as recited in claim 10 wherein the trace is fetched after the instruction is executed.

15. A data processor comprising:
an instruction pipeline for processing computer instructions, the instruction pipeline including a fault detector configured to determine whether a computer instruction is subject to a higher priority fault than a dynamic address redirection table (DART)-triggered fault; and
an address generator for asserting instruction addresses on a bus, the address generator being configured to determine locations in memory of instructions to be fetched into the pipeline, the address generator being separate from the instruction pipeline, the address generator including:
a dynamic address redirection table (DART) for replacing a virtual instruction address with multiple virtual trace addresses when the computer instruction is not subject to the higher-priority fault, in which:
the virtual instruction address identifies an instruction location in memory of an instruction that would cause the fault detector to detect the trigger fault if fetched, the instruction location also having a physical instruction address,
the instruction is not subject to a higher priority fault, and
the virtual trace address identifies to a trace location of a trace for emulating the instruction without causing the fault detector to detect the trigger fault, the trace location also having a physical trace address, and
a translation lookaside buffer (TLB) for translating the virtual trace address to the physical trace address.

16. A data processor as recited in claim 15 wherein the trigger fault is a virtualization fault.

17. A data processor as recited in claim 15 wherein all addresses of instructions to be fetched into the pipeline are input to the DART to determine whether or not, for each address input to the DART, it should be replaced by an address for a respective trace.

18. A data processor as recited in claim 15 wherein only the addresses of instructions for which a virtualization fault has been detected by the fault detector are entered into the DART.

19. A data processor as recited in claim 15 wherein the address generator is configured to assert the physical trace address on the bus to fetch the trace.

20. A data processor as recited in claim 18 wherein the address generator is configured to assert an address of a fault-handling routing in the event the DART does not replace a virtual address of a second instruction for which the fault detector has detected a virtualization fault with a trace address.

21. A data processor as recited in claim 15 wherein the pipeline includes an instruction decoder having a virtualization mode that when active, intercepts privileged instructions, and when inactive, allows privileged instructions to execute without interception.

22. A data processor as recited in claim 15 wherein the fault detector includes an instruction trap that indicates a virtualization fault when an instruction of a predetermined type is detected.

23. The method of claim 22, further comprising:
after generating the trace:
re-fetch the instruction into the pipeline; and
fetch the trace into the pipeline to follow the instruction.

24. A data processor as recited in claim 15 wherein the DART includes:
a cache that associates virtual instruction addresses with virtual trace addresses, and
a controller for dynamically updating the cache.

25. A computer system comprising:
a data processor including:
an instruction pipeline for processing computer instructions, the instruction pipeline including a fault detector for determining whether a computer instruction is subject to a higher-priority fault than a dynamic address redirection table (DART)-triggered fault; and
an address generator, separate from the instruction pipeline, for asserting instruction addresses on a bus, the address generator being configured to determine locations in memory of instructions to be fetched into the pipeline, the addresses including a virtual instruction address identifying an instruction location in memory of an instruction that would, if executed, cause the fault detector to detect a virtualization fault, the instruction location also having a physical instruction address, the address generator including:
a dynamic address redirection table (DART) for replacing a the virtual instruction address with a virtual trace address of a trace for emulating the instruction without causing the fault detector to detect a virtualization fault when the computer instruction is not subject to the higher-priority fault, and
a translation lookaside buffer (TLB) for translating the virtual trace address into the physical trace address;
a trace return register to store an address of the instruction that causes a trace generator to be called; and
memory configured to store the instruction at the instruction location and to store the trace at the trace location.

26. A computer system as recited in claim 25 wherein the instruction pipeline includes an instruction decoder having a virtualization mode, the memory storing a host operating system and a guest operating system, the host operating system controlling the virtualization mode so that the decoder is in the virtualization mode when instructions of the guest operating system are being decoded so that any virtualization-sensitive instructions of the guest operating system are intercepted.

27. A computer system as recited in claim 25 wherein the fault detector is configured to detect a virtualization fault associated with a virtualization-sensitive instruction that would not have caused a virtualization fault outside of virtualization mode.

28. A computer system as recited in claim 25 wherein the trace, when executed, emulates a series of instructions of the guest operating system.

29. A computer system as recited in claim 28 wherein the number of instructions in the trace differs from the number of instructions in the series.

30. A method comprising:
fetching a guest instruction into an instruction pipeline of a data processor;
detecting a dynamic address redirection table (DART)-triggered fault associated with the instruction;
determining whether the instruction is subject to a higher priority fault than a dynamic address redirection table (DART)-triggered fault;
generating a trace for the instruction and storing the trace in memory, when the instruction is not subject to the higher priority fault;
writing an entry into a dynamic address redirection table (DART) of the data processor, the entry associating an address of a memory location storing the instruction with an address of a memory location storing the trace, the DART being separate from the instruction pipeline; and
translating a virtual trace address into a physical trace address using a translation lookaside buffer (TLB).

31. A method as recited in claim 30 wherein the trigger fault is a virtualization fault.

32. A method as recited in claim 30 further comprising:
after the writing, generating the virtual instruction address;
inputting a virtual instruction address into the DART so that a virtual trace address is output;
inputting the virtual trace address into a translation lookaside buffer (TLB) so that a physical trace address is output; and
fetching at least one instruction of the trace from the trace location.

33. A method as recited in claim 32 further comprising executing the trace without causing a virtualization fault.

34. A method as recited in claim 32 further comprising:
before fetching the guest instruction, running a host operating system so as to activate a virtualization mode for the processor; and
running a guest operating system including virtualization-sensitive instructions so as to intercept them upon decoding, the detecting involving detecting a virtualization fault associated with a virtualization mode state of the guest.

35. A method as recited in claim 34 further comprising resuming running the host operating system so as to inactivate the virtualization mode.

* * * * *